United States Patent
Jiménez Del Lago et al.

(10) Patent No.: US 8,128,029 B2
(45) Date of Patent: Mar. 6, 2012

(54) VENTRAL FAIRING FOR AN AIRCRAFT

(75) Inventors: Mario Jiménez Del Lago, Madrid (ES); Julián Pérez Serrano, Madrid (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 98 days.

(21) Appl. No.: 11/727,362

(22) Filed: Mar. 26, 2007

(65) Prior Publication Data

US 2008/0099610 A1      May 1, 2008

(30) Foreign Application Priority Data

Oct. 31, 2006    (ES) ................................. 200602769

(51) Int. Cl.
*B64C 1/00*      (2006.01)
(52) U.S. Cl. ........................................ 244/119; 244/130
(58) Field of Classification Search .................. 244/119, 244/130; D12/319, 322, 345
See application file for complete search history.

(56) References Cited

U.S. PATENT DOCUMENTS

| | | | |
|---|---|---|---|
| 3,942,746 A | | 3/1976 | Carter et al. |
| 5,803,405 A | * | 9/1998 | Ellis et al. ..................... 244/130 |
| 6,068,215 A | * | 5/2000 | Gruensfelder et al. .... 244/129.5 |
| 6,176,196 B1 | * | 1/2001 | Halter ........................... 114/271 |
| 6,581,877 B2 | * | 6/2003 | Pauly ............................ 244/131 |
| 6,655,635 B2 | * | 12/2003 | Maury et al. ................. 244/131 |
| 2003/0006344 A1 | * | 1/2003 | Pauly ............................ 244/130 |
| 2003/0066933 A1 | * | 4/2003 | Maury et al. ................. 244/130 |
| 2005/0178912 A1 | | 8/2005 | Whelan et al. |
| 2005/0230535 A1 | | 10/2005 | Ruszkowski |
| 2005/0247821 A1 | * | 11/2005 | Rouyre ...................... 244/129.1 |
| 2006/0065784 A1 | * | 3/2006 | Rouyre ......................... 244/119 |

FOREIGN PATENT DOCUMENTS

| | | |
|---|---|---|
| WO | 97/35105 | 9/1997 |
| WO | 2004/098992 | 11/2004 |

OTHER PUBLICATIONS

Report of the State of the Art issued by the Spanish Patent Office on Mar. 16, 2009 corresponding to Spanish Patent Application No. 200602769.
Extended European Search Report issued on Jun. 9, 2010 in corresponding European Patent Application 07 380 076.5.
Communication pursuant to Rule 71(3) EPC ("Communication of Intention to Grant a Patent") issued on Apr. 18, 2011 in corresponding European Patent Application 07 380 076.05.

\* cited by examiner

*Primary Examiner* — Tien Dinh
*Assistant Examiner* — Justin Benedik
(74) *Attorney, Agent, or Firm* — Wenderoth, Lind & Ponack, L.L.P.

(57) ABSTRACT

Ventral fairing for an aircraft provided between a left wing and a right wing, which comprises a lower central section of convex transverse cross-section located between the left lower surface of the left wing and the right lower surface of the right wing, and with an angle between the cross-section of the fairing and the line of cross-section corresponding to the lower surface of each wing of less than 90 degrees, separate left and right lower lateral sections of concave transverse cross-section which are respectively extended between the lower surface of each wing and the central section; separate first lines of inflection between the lower surface of each wing and the corresponding lateral section; separate second lines of inflection between the lateral sections and the central section.

7 Claims, 5 Drawing Sheets

VENTRAL FAIRING FOR AN AIRCRAFT

This invention belongs to the technical field of the design of aerodynamic surfaces of aircraft, particularly the design of the external shape of the ventral fairing (wing-fuselage fairing).

BACKGROUND OF THE INVENTION

The main aim of the ventral fairing of an aircraft is to ensure that it has the necessary useful volume inside it for housing other components such as the main landing gear and the installation of different systems.

The aerodynamic interaction of the ventral fairing with the wing, as well as with the fuselage, is significant both at high subsonic speeds (close to the transonic regime) and at low speeds (close to the incompressible regime). High subsonic speeds are usually defined as being speeds at which the Mach number (Mn) is between 0.7 and 0.95.

The aim of a good aerodynamic design for the outer shape of the ventral is fairing is to minimize the negative interferences between the three interrelated elements (wing, fairing and fuselage), which are sources of aerodynamic drag and of loss of lift of the aircraft, as well as to improve the airflow adherence conditions which a wing-fuselage unit would have without a fairing. In view of the important influence of the fairing on the fluid field around the wing and the fuselage, and therefore on the action of the aircraft, and without at any moment losing sight of the fundamental purpose of the fairing, the external shape thereof must be, as are a large part of engineering products, a compromise solution deriving from the consensus between engineering solutions from different disciplines.

For a given useful interior volume, the shape of the fairing plays an essential role in maximizing the aerodynamic benefit of the aircraft. From an aerodynamic point of view, conventional fairings that were known prior to this invention basically started from the following technical solutions.

A first conventional technical solution corresponds to a simple fairing substantially domed and projecting from below the contour of the fuselage, whose intersection with the aerodynamics of the wing is limited to viscous effects, fundamentally on the upper outer surface of the wing via the upper central zone of the fairing commonly known as the "fillet" (Egbert Torenbeek, "Synthesis of Subsonic Aircraft Design"; Delft University Press, 1976), while the rest (front, lower central and rear zone) of the fairing generally possesses a gentle curvature in the direction of the flow with the aim of minimizing the growth of the limit layer of the actual fairing, through without strongly interacting with the airflow around the wing. An example of such a first conventional technical solution is the ventral fairing of the AIRBUS A330.

A second conventional technical solution corresponds to a more complex fairing which only minimally projects from below the contour of the fuselage, with a greater degree of favorable aerodynamic intersection with the wing, due primarily to the fact that evolution in the direction of the longitudinal axis of the fuselage (X) of the transverse area enclosed by the fairing is highly integrated in the law of global areas of the aircraft (Richard T. Whitcomb, 1952), with the penalisation in the aerodynamic drag of the aircraft being reduced at high subsonic speeds in comparison with the first conventional technical solution. An example of such a second conventional technical solution is the ventral fairing of the AIRBUS A380.

Both conventional solutions share the general shape of the transverse cross-section of their outer surface. In other words, the cross-sections cut through planes perpendicular to the longitudinal axis of the fuselage, which can be referred to as classical and which possess certain distinctive geometric characteristics. So, this "classical" geometric shape presents a symmetric curve with respect to the plane of symmetry of the aircraft, being of variable curvature but always convex as seen from the inside of the volume enclosed by the fairing. In other words, without any changes of the sign of the curvature and without any points of inflection, while the angle ($\phi$) between the cross-section of the fairing and the line corresponding to the cross-section of the lower surface of the wing is an acute angle close to 90 degrees.

Although the second conventional technical solution represents an improvement over the first technical solution from the point of view of aerodynamic drag of the complete aircraft at high subsonic speeds, the volume that it permits to be enclosed by the ventral fairing in its forward part is proportionally significantly less compared to the first conventional technical solution, which implies a consequent drawback when it comes to installing systems in the ventral fairing area.

It is therefore desirable to find a new technical solution for the shape of the ventral fairing which would permit certain aerodynamic characteristics similar to those corresponding to the second conventional technical solution to be combined with a greater useful volume for the installation of systems in its forward part and in its middle part, close to that of a fairing according to the first conventional technical solution.

SUMMARY OF THE INVENTION

The aim of the present invention concerns a new shape of ventral fairing for an aircraft with aerodynamic characteristics that are at least similar to those of the second conventional technical solution and with a greater useful volume for the installation of systems in its forward part and in its middle part. This aim is achieved by means of a ventral fairing that is symmetric with respect to the plane of symmetry of an aircraft provided between a left wing with a left lower surface and a right wing of the aircraft with a right lower surface, which comprises a lower central section of convex transverse cross-section located between the left and the right lower surface, and with an angle $\phi$ of less than 90 degrees between the cross-section of the fairing and the line of cross-section corresponding to the lower surface of each wing, and which is characterised in that it furthermore comprises:

a lower left lateral section of concave transverse cross-section which is extended between at least part of said left lower surface and said central section, and a lower right lateral section of concave transverse cross-section which is extended between at least part of said right lower surface and said central section;

a first line of inflection between the lower surface of each wing and the corresponding lateral section; and a second line of inflection between each lateral section and the central section.

The angle $\phi$ is preferably the minimum possible while remaining compatible with the structural and sealing restrictions between the central fairing and the wing. A typical structural restriction, for example, is the fact that the panel for the fairing has a defined thickness which means that it is not feasible for the panels of the lower surface of the wing and of the fairing to be tangent to each other, while one of the sealing restrictions is that the rubber seals applied between the panels of the wing and those of the fairing need a minimum angle of sealing for ensuring the required level of airtightness. Both types of restrictions impose a minimum angle $\phi$ which depends on the technique used and which is usually around 10°. In view of this, according to the present invention the angle φ is preferably less than 45° and more preferably less than 30°, though greater than 10°. In a preferred embodiment the angle φ is between 10° and 15°.

In a preferred embodiment of the invention, the ventral fairing comprises a forward part in which is arranged the respective concave lateral sections and the first lines of inflection, a rear part of convex transverse cross-section which does not include the concave lateral sections nor the first lines of inflection, and separate transition sections in which the configuration of the transverse cross-section of the forward part becomes progressively adapted to the configuration of the transverse cross-section of the rear part.

By means of the novel configuration of the ventral fairing of the present invention, a useful interior volume for housing is achieved similar to that of the ventral fairings according to the first solution of the state of the art described above at the same time as, according to the extent it has been possible to verify in aerodynamic tests, achieving an aerodynamic behaviour similar to that of the ventral fairings according to the second technical solution described above.

In addition, and to the extent it has been possible to check experimentally, from a purely aerodynamic point of view the configuration of the ventral fairing according to the present invention achieves a series of advantages with regard to the first conventional technical solution. The airflow incident on the zone of the wing close to the fuselage ("inner wing") is slowed down, which on the one hand implies a decrease in the negative compressibility effects of the air at high subsonic speeds and, on the other implies a reduction in the adverse pressure gradient on the lower surface of the inner wing. Both effects lead to an increase in the aerodynamic effect (lift/drag ratio). In the event that the aircraft has its motors attached beneath the wing, this result is amplified and, also, the appearance of a detachment of the flow on the lower surface of the inner wing at very high subsonic speeds and low lift coefficients is delayed/eliminated. Likewise, when the aircraft is flying at low speeds and high lift coefficients, the greater overpressure on the lower surface of the inner wing leads to an increase in the lift of the aircraft for a particular leading angle.

BRIEF DESCRIPTION OF THE FIGURES

Described below are some practical aspects of embodiments of the invention based on some figures, in which.

Figure 1:
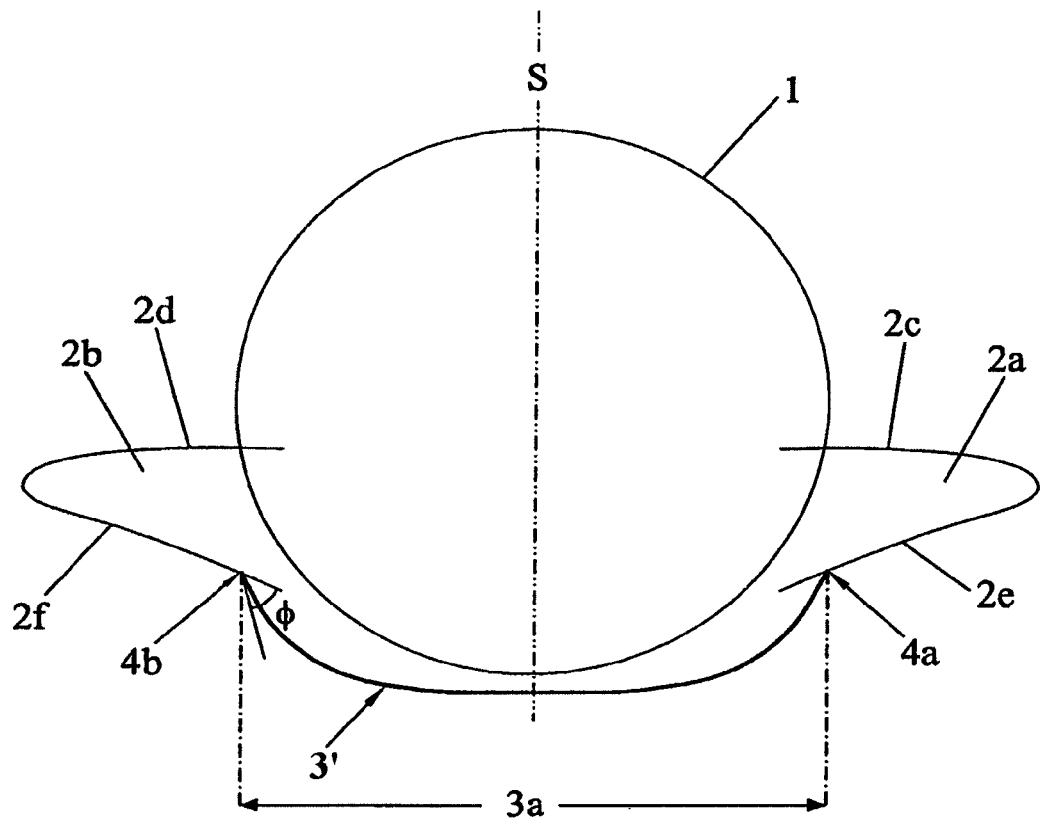
FIG. 1 is a schematic view in transverse cross-section of a ventral fairing according to a first conventional technical solution.

Appearing in these figures are numerical references identifying the following elements:
1 aircraft fuselage
1a forward end of aircraft
2a left wing
2b right wing
2c outer upper surface of the left wing
2d outer upper surface of the right wing
2e outer lower surface of the left wing
2f outer lower surface of the right wing
3 ventral fairing according to an embodiment of the present invention
3' ventral fairing according to a first conventional technical solution
3" ventral fairing according to a second convention technical solution
3a lower central section of the ventral fairing
3b right lower lateral section of the ventral fairing
3c left lower lateral section of the ventral fairing
3d forward part of the ventral fairing
3e rear part of the ventral fairing
3f rear end part of the ventral fairing
3g transition section
4a first left line of inflection
4b first right line of inflection
4c second left line of inflection
4d second right line of inflection
S vertical plane of symmetry of the aircraft
X direction of the longitudinal axis of the fuselage

DETAILED DESCRIPTION OF THE INVENTION

Figure 2:
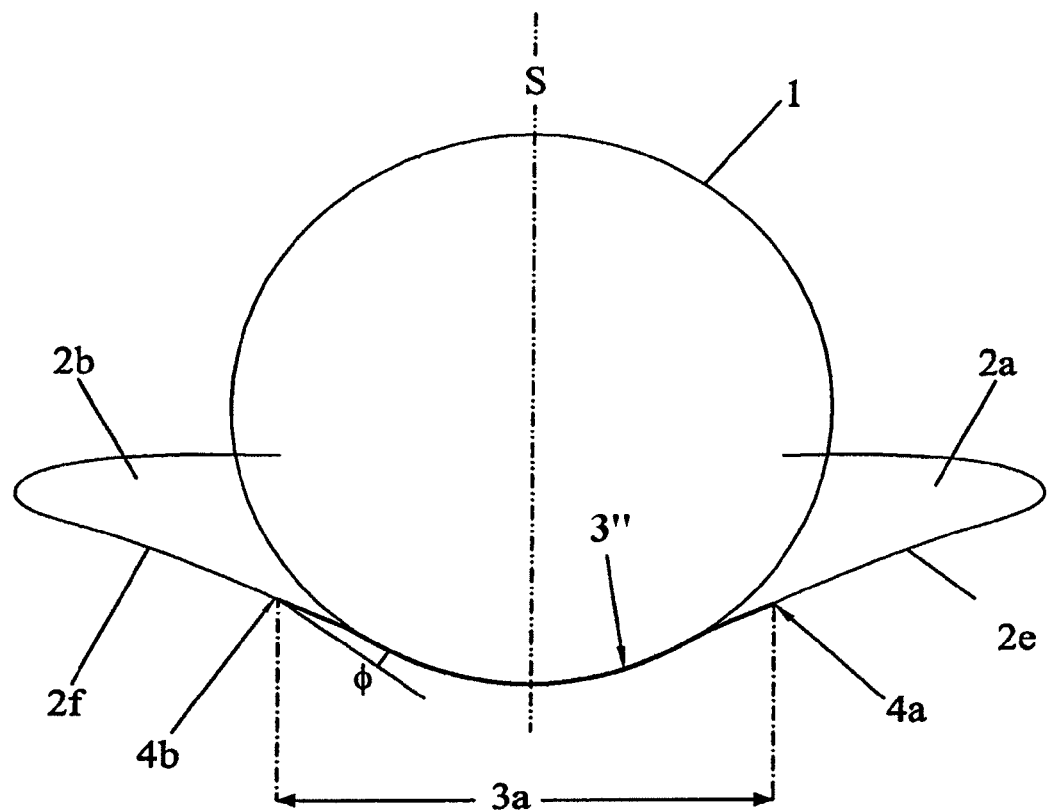
FIG. 2 is a schematic view in transverse cross-section of a ventral fairing according to a second conventional technical solution.

FIGS. 1 and 2 show conventional embodiments of a ventral fairings 3' and 3" mounted on the fuselage 1 of an aircraft which has a left wing 2a with an outer upper surface 2c and an outer lower surface 2e which emerge from the respective sides of the fuselage 1. The ventral fairings 3' and 3" comprise a lower central section 3a which is extended between the union 4a of the ventral fairings 3' and 3" with the lower surface 2e of the left wing 2a and the union 4b of the ventral fairing 3' and 3" with the lower surface 2f of the right wing 2b. The fairings 3 are symmetric with respect to the longitudinal axis of symmetry S.

In the first conventional embodiment shown in FIG. 1, the domed lower central section 3a which substantially projects downward from the contour of the fuselage 1 in such a way that the fairing permits the useful volume of the fuselage to be increased; however, its aerodynamic performance could be improved. Alternatively, in the second conventional embodiment shown in FIG. 2, the lower central section 3a essentially does not project downwards from the lower contour of the fuselage 1, as a result this second conventional embodiment, though it offers better aerodynamic performance than that of the first conventional embodiment, encloses a useful volume that is smaller than that of the first conventional embodiment. In both cases, the angle φ between the cross-section of the fairing and the line of cross-section corresponding to the lower surface of each wing is acute, in other words, less than 90°.

Figure 3:
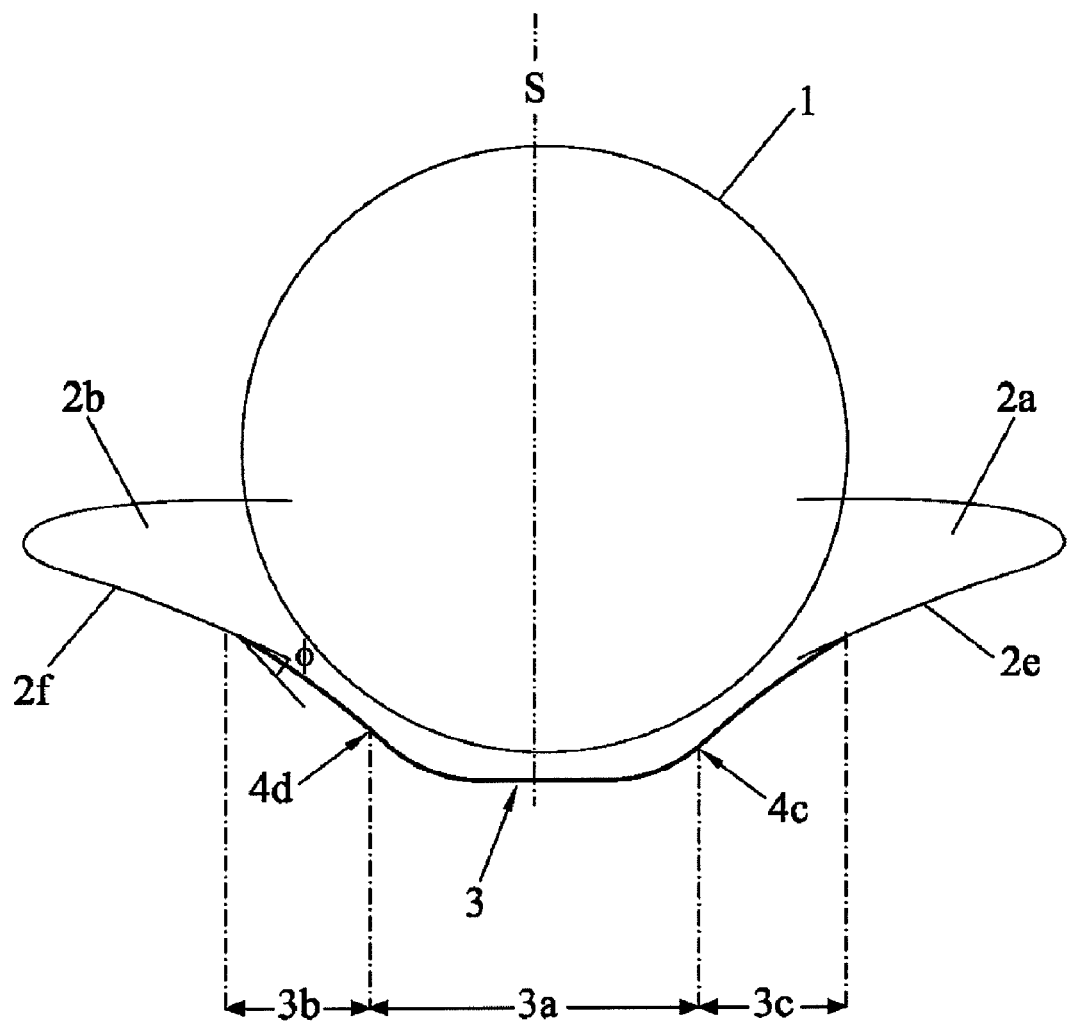
FIG. 3 is a schematic view in transverse cross-section of a ventral fairing according to an embodiment of the present invention.
Figure 4:
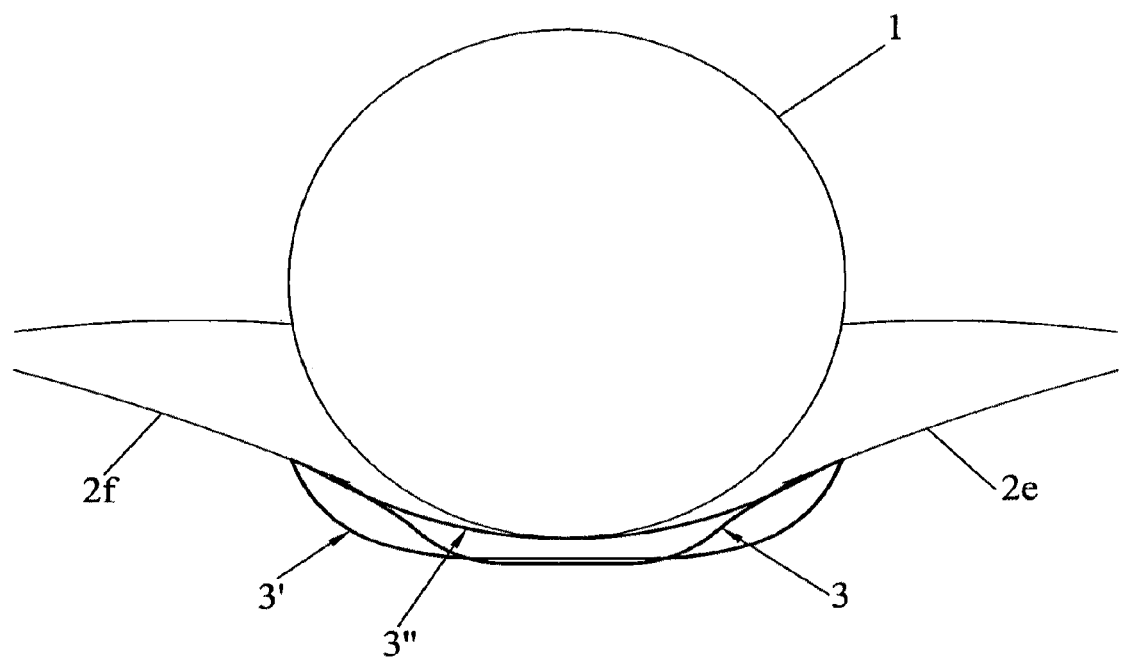
FIG. 4 is a schematic view in transverse cross-section in which can be seen on a comparative basis the conventional technical solutions shown in FIGS. 1 and 2 and the embodiment of the present invention shown in FIG. 3.
Figure 5:
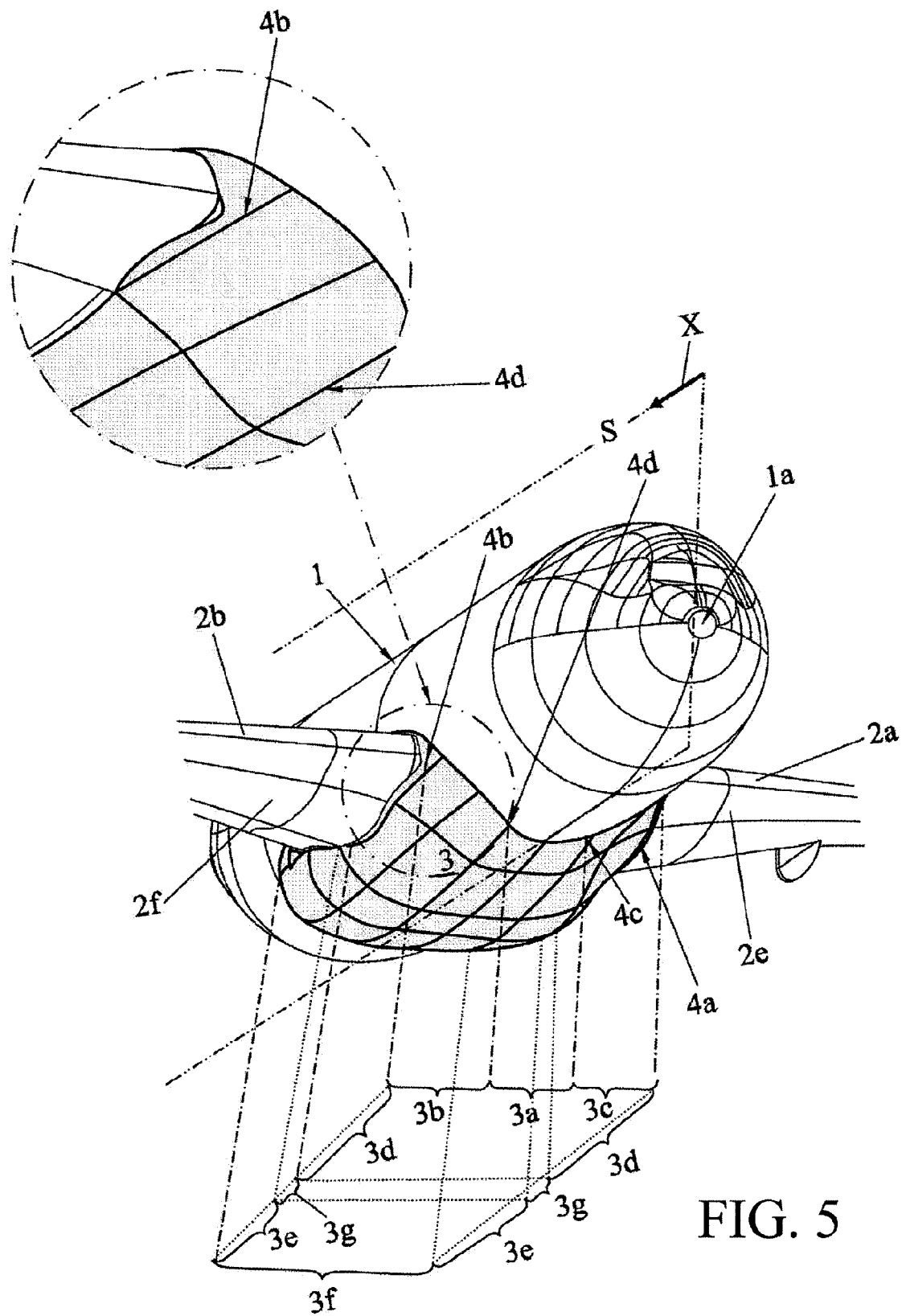
FIG. 5 is a schematic view in lower front perspective of an aircraft with a ventral fairing according to the present invention.

In the embodiment of the present invention shown in FIGS. 3 and 5 (and comparatively also in FIG. 4), the ventral fairing also includes a left lower lateral section 3c of concave transverse cross-section which is extended between the left lower wing surface 2e and the central section 3a, and a right lower lateral section 3b, also of concave transverse cross-section, which is extended between the right lower wing surface 2f and the said central section 3a.

Between the left lower wing surface 2e and the left lateral section 3c is extended a first left line of inflection 4a while between the right lower wing surface 2f and the right lateral section 3b is extended a first right line of inflection 4b. In turn, between the left lateral section 3c and the central section 3a is extended a second left line of inflection 4c while between the right lateral section 3b and the central section 3a is extended a second right line of inflection 4d. The angle φ between the cross-section of the fairing 3 and the line of cross-section corresponding to the lower surface of each wing is 15°.

According to that shown in FIG. 5, the lateral sections 3c, 3b, and therefore the lines of inflection 4a, 4b, are present only in the forward part 3d but not in the rear part 3e of the fairing 3, so that between those parts 3d, 3e there exist separate transition sections 3g in which the configuration of the transverse cross-section of the forward part 3d is progressively adapted in the direction of the rear end part 3f of the ventral fairing 3 to the configuration of the transverse cross-section of the rear part 3e. As can also be seen in the figure, the ventral fairing 3 is symmetric with respect to the vertical longitudinal axis of symmetry X of the aircraft fuselage 1.

FIG. 4 shows a comparison of the useful interior volumes of the ventral fairing 3 of the present invention shown in FIG. 3, a ventral fairing 3' according to the first conventional configuration shown in FIG. 1 and a ventral fairing 3" according to the second conventional configuration shown in FIG. 2. It can be seen that the useful volume enclosed by the fairing 3 of the present invention is somewhat less than that of the convention fairing 3' but substantially greater than that of the conventional fairing 3". Nevertheless, taking into account the advantages presented by the fairing 3 of the present invention compared to the conventional fairing 3', it can be concluded that the present invention is advantageous compared to either of the two conventional ventral fairings 3', 3".

The invention claimed is:

1. A ventral fairing for an aircraft locatable between a left wing with a left lower surface and a right wing of the aircraft with a right lower surface, the ventral fairing comprising:
   a lower central section of convex transverse cross-section locatable between said left lower surface and said right lower surface;
   an angle of less than 90 degrees between the cross-section of the fairing and the line of cross-section corresponding to the lower surface of each wing;
   a left lateral section of concave transverse cross-section which is extended between at least part of said left lower surface and said central section, and a right lateral section of concave transverse cross-section which is extended between at least part of said right lower surface and said central section;
   separate first lines of inflection between the lower surface of each wing and the corresponding lateral section;
   separate second lines of inflection between the lateral sections and the central section;
   a forward part in which are arranged said left and right lateral sections and the first lines of inflection;
   a rear part of convex transverse cross-section which does not include said left and right lateral sections nor the first lines of inflection; and
   separate transition sections in which the configuration of the transverse cross-section of the forward part is progressively adapted to the configuration of the transverse cross-section of the rear part.

2. The ventral fairing according to claim 1, wherein the angle between the cross-section of the fairing and the line of cross-section corresponding to the lower surface of each wing is from 10° to 45°.

3. The ventral fairing according to claim 1, wherein the angle between the cross-section of the fairing and the line of cross-section corresponding to the lower surface of each wing is from 10° to 30°.

4. The ventral fairing according to claim 1, wherein the angle between the cross-section of the fairing and the line of cross-section corresponding to the lower surface of each wing is from 10° to 15°.

5. The ventral fairing arrangement according to claim 1, wherein the separate transition sections progressively reduce the left lateral concave cross-section and the right lateral concave cross-section in size in a direction away from said forward part toward said rear part such that the left lateral concave transverse cross-section and the right lateral concave transverse cross-section are eliminated at said rear part.

6. A ventral fairing arrangement comprising:
   a left wing having a left lower surface;
   a right wing having a right lower surface; and
   a ventral fairing having
   a central convex transverse cross-section located between the left lower surface and the right lower surface,
   a left lateral concave transverse cross-section located between at least part of the left lower surface and the central convex transverse cross-section, and
   a right lateral concave transverse cross-section which is located between at least part of the right lower surface and the central convex transverse cross-section,
   wherein the angle between the ventral fairing and the left lower surface is less than 90° and the angle between the ventral fairing and the right lower surface is less than 90°,
   wherein a first left point of inflection is formed between the left lower surface and the left lateral concave transverse cross-section and a first right point of inflection is formed between the right lower surface and the right lateral concave transverse cross-section,
   wherein a second left point of inflection is formed between the left lateral concave transverse cross-section and the central convex transverse cross-section and a second right point of inflection is formed between the right lateral concave transverse cross-section and the central convex transverse cross-section,
   wherein the ventral fairing further has a forward section, and a rear section, and
   wherein the left lateral concave cross-section and the right lateral concave cross-section are progressively reduced in size in a direction away from the forward section toward the rear section such that the left lateral concave transverse cross-section and the right lateral concave transverse cross-section are eliminated at the rear section.

7. A ventral fairing for use attached between a left lower wing surface and a right lower wing surface, the ventral fairing having:
   a central convex transverse cross-section;
   a left lateral concave transverse cross-section; and
   a right lateral concave transverse cross-section,
   wherein the left lateral concave transverse cross-section is configured such that, when the ventral fairing is attached between the left lower wing surface and the right lower wing surface, an angle of less than 90° is formed between the ventral fairing and the left lower wing surface,
   wherein the right lateral concave transverse cross-section is configured such that, when the ventral fairing is attached between the left lower wing surface and the right lower wing surface, an angle of less than 90° is formed between the ventral fairing and the right lower wing surface, wherein the left lateral concave transverse cross-section is configured such that, when the ventral fairing is attached between the left lower wing surface and the right lower wing surface, a first left point of inflection is formed between the left lower wing surface and the left lateral concave transverse cross-section, wherein the right lateral concave transverse cross-section is configured such that, when the ventral fairing is attached between the left lower wing surface and the right lower wing surface, a first right point of inflection is formed between the right lower wing surface and the right lateral concave transverse cross-section, wherein a second left point of inflection is formed between the left lateral concave transverse cross-section and the central convex transverse cross-section and a second right point of inflection is formed between the right lateral concave transverse cross-section and the central convex transverse cross-section, wherein the ventral fairing further has a forward section, and a rear section, and wherein the left lateral concave cross-section and the right lateral concave cross-section are progressively reduced in size in a direction away from the forward section toward the rear section such that the left lateral concave transverse cross-section and the right lateral concave transverse cross-section are eliminated at the rear section.

* * * * *